UNITED STATES PATENT OFFICE.

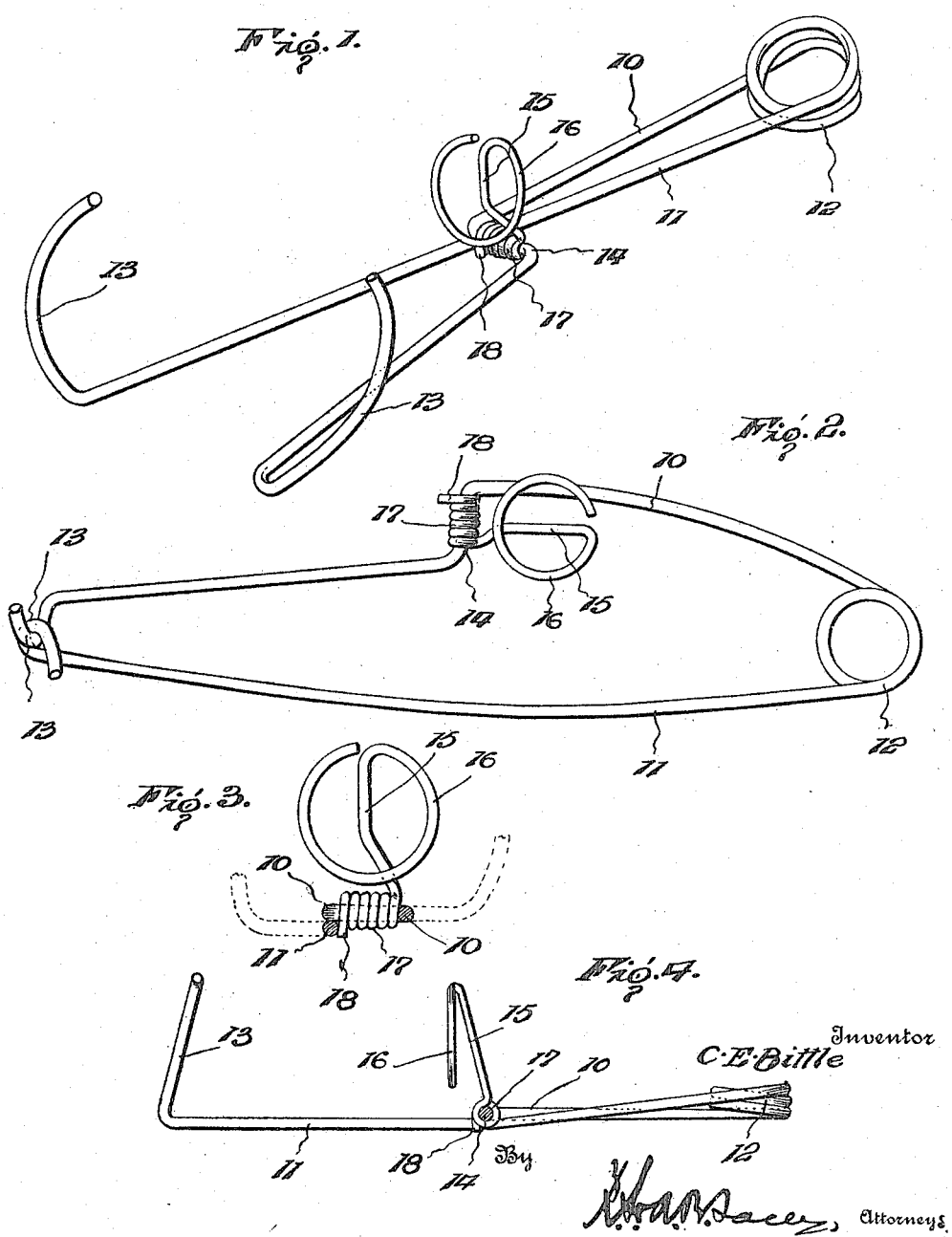

CLARENCE E. BITTLE, OF HARLAN, IOWA, ASSIGNOR TO OMAR P. WYLAND, OF HARLAN, IOWA.

ANIMAL-TRAP.

1,222,063.

Specification of Letters Patent.

Patented Apr. 10, 1917.

Application filed June 6, 1916. Serial No. 102,014.

*To all whom it may concern:*

Be it known that I, CLARENCE E. BITTLE, a citizen of the United States, residing at Harlan, in the county of Shelby and State of Iowa, have invented certain new and useful Improvements in Animal-Traps, of which the following is a specification.

This invention contemplates an improved trap and relates more particularly to a device of this character especially designed for catching gophers.

The invention has as its primary object to provide a device of this character wherein an animal approaching the trap will have free and unobstructed passage between the jaws of the trap to the trigger, so that the said animal will not have to step over or tramp upon any portion of the trap in moving to a position to be caught thereby.

The invention has as a further object to provide a device of this character which may be set and inserted in a gopher hole and so formed that the animal cannot escape from the hole without passing between the coacting jaws of the trap to come in contact with the trigger to release the said jaws to catch the animal.

And the invention has as a still further object to provide a device of this character which will be formed of few and simple parts and thus be unlikely to get out of order and which furthermore may consequently be manufactured at minimum cost.

Other and incidental objects will appear as the description proceeds and in the drawings wherein I have illustrated the preferred embodiment of the invention and wherein similar reference characters designate corresponding parts throughout the several views, Figure 1 is a perspective view showing the trap set and arranged in normal operative position, Fig. 2 is a plan view showing the manner in which the jaws of the trap are adapted to engage for catching an animal therebetween, Fig. 3 is a transverse sectional view particularly showing the mounting of the trigger and the manner in which the trigger is adapted to coact with the arms of the trap for holding the trap set, and Fig. 4 is a longitudinal sectional view particularly illustrating the normal disposition of the trigger when the trap is set.

In carrying out the invention, the body of the device is formed with coacting arms 10 and 11 which are connected and yieldably supported by a spring 12, with the said arms normally tending to assume an outwardly divergent relation. Preferably, the body of the device is formed from a length of resilient wire or other suitable material bent intermediate its ends to provide the spring 12 with the extremities of the said length of material forming the arms 10 and 11. At their outer ends, the said arms are bent laterally to form upwardly directed coacting jaws 13 which are preferably longitudinally curved outwardly in opposite directions and are disposed to engage, as particularly shown in Fig. 2 of the drawings, one within the other.

The arm 10 is, preferably at a point substantially midway the ends thereof, offset to provide a laterally directed arm or shoulder 14 and mounted upon the said shoulder, is a trigger 15. This trigger is preferably formed from a length of suitable wire bent adjacent one extremity to provide a relatively large circular head 16 arranged transversely with respect to the arms 10 and 11 with the opposite extremity of the said wire extending from the said head to provide a shank for the trigger. This shank, adjacent the inner extremity thereof, is loosely wound about the shoulder 14 to in effect form a sleeve 17 pivotally supporting the trigger upon the said shoulder with the free terminal of the shank projecting radially from the said sleeve to form a stop lug 18. In this connection, it is to be observed that the stop lug 18 is arranged adjacent the outer extremity of the shoulder 14 while the shank 15 is adapted to support the head 16 of the trigger in spaced relation above the forward extremities of the arms 10 and 11 of the trap.

As will now be noted the arms 10 and 11 are arranged in crossed relation and the spring 12 will normally act to urge the jaws 13 into engagement with each other. To set the trap, the arms 10 and 11 are moved against the tension of the spring 12 to assume a position with the arm 11 extending beneath the outer extremity of the shoulder 14 when the trigger 15 is then swung upwardly to cause the stop lug 18 to project downwardly from the said shoulder in front of the said arm to engage therewith for holding the jaws in spaced relation. The trap may thus be easily set and it will be observed that the spread between the jaws 13 may be easily varied in the practical manufacture of the trap by either lengthening or shortening the shoulder 14 and forming the sleeve 17 of the trigger to accord therewith.

Attention is now particularly directed to the fact that when the trap is set, as shown in Fig. 1 of the drawings, the space between the forward extremities or working ends of the arms 10 and 11 is totally unobstructed and the head 16 of the trigger is supported above the said arms, as more particularly shown in Figs. 3 and 4 of the drawings, in a plane between the jaws 13. In use, the trap is preferably first set and then inserted jaws first in the outer end of the hole inhabited by the animal to be caught, it being remembered, in this connection, that the device is particularly designed for catching gophers although, as will be apparent from the description of the invention, as herein given, the device may be successfully used for catching various other types of animals. When so inserted in the hole of the animal, the jaws 13 will be disposed adjacent the sides of the hole with the trigger 15 occupying a central location within the hole. The purpose in providing the trigger with the enlarged head 16 will now become apparent since it will be seen that by such construction, the animal cannot likely emerge from the hole without coming in contact with the trigger. As will also be clear, in this connection, the animal cannot emerge from the hole without passing between the jaws 13 and since the space between the working ends of the jaws is unobstructed, particular attention is also directed to the fact that in order to pass between the jaws to the trigger 15, it will not be necessary for the animal to step over or tread upon any portion of the trap to trip the trigger. Obviously, this is an important feature of advantage in the present invention since, by such arrangement, the animal will not likely become scared by the presence of the trap within the hole and will not be frightened away from the trap upon approaching between the jaws thereof by having to walk upon or step over any foreign obstacles in the floor of the hole. I, therefore, provide a construction which has been found very effective in use. The jaws 13 are so spaced in advance of the trigger 16 that when the fore part of the body of the animal comes in contact with the head of the trigger to rock the said trigger upon the shoulder 14 and shift the stop lug 18 to release the arms 10 and 11, the central part of the body of the animal will be disposed between the jaws 13 which will then be quickly moved inwardly toward each other to catch the animal.

It will therefore be seen that I provide a very simple construction for the purpose set forth and, as above referred to, one which will prove very effective in use. Furthermore, attention is directed to the fact in this connection, that the entire trap is formed of but two elements each of which is constructed of but a single piece of material. The device may thus be easily manufactured at minimum cost while, at the same time, the trap is not likely to get out of order.

Having thus described my invention, what I claim and desire to secure by Letters Patent is:

1. A device of the character described including crossed arms, coacting jaws carried thereby, yieldable means associated with the said arms and normally acting thereon to urge the said jaws toward each other, one of the said arms being formed with a lateral shoulder, and a trigger pivotally connected to said shoulder and engaging the other arm at the point of intersection of the said arms for holding the jaws in spaced relation.

2. A device of the character described including cross arms, coacting jaws carried thereby, yieldable means associated with the said arms and normally acting thereon to urge the said jaws toward each other, and a trigger having a sleeve mounted upon one of said arms to pivotally support the trigger with the said sleeve extending transversely with respect to the arms adjacent the point of intersection thereof and provided with a stop lug engaging the other of said arms for holding the said jaws in spaced relation, the said sleeve supporting the stop lug in position to hold the outer extremities of said arms relatively wide apart.

In testimony whereof I affix my signature.

CLARENCE E. BITTLE. [L. S.]

Copies of this patent may be obtained for five cents each, by addressing the "Commissioner of Patents, Washington, D. C."